April 1, 1952      J. E. CARTER      2,590,933

DOWEL BAR AND JOINT SEALING STRIP CONSTRUCTION

Filed April 15, 1946      3 Sheets-Sheet 1

INVENTOR.
John E. Carter
BY
HIS ATTORNEYS

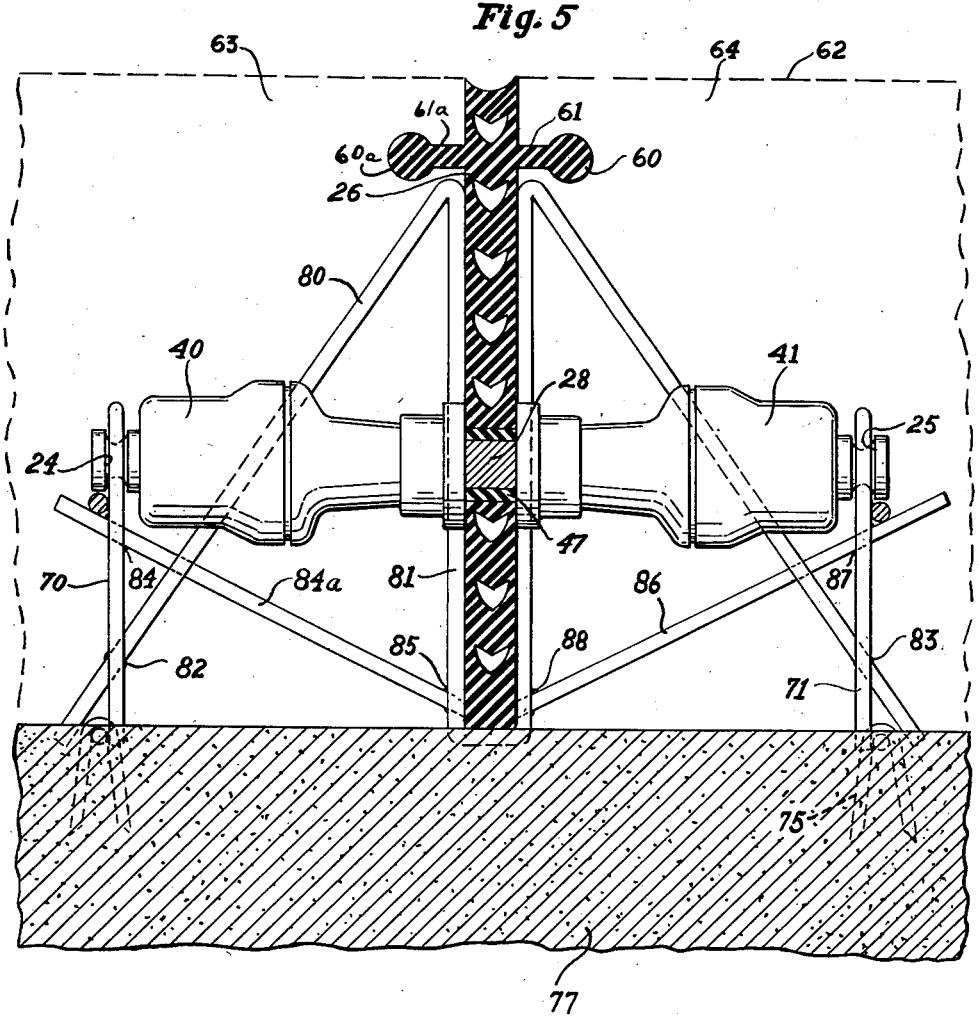

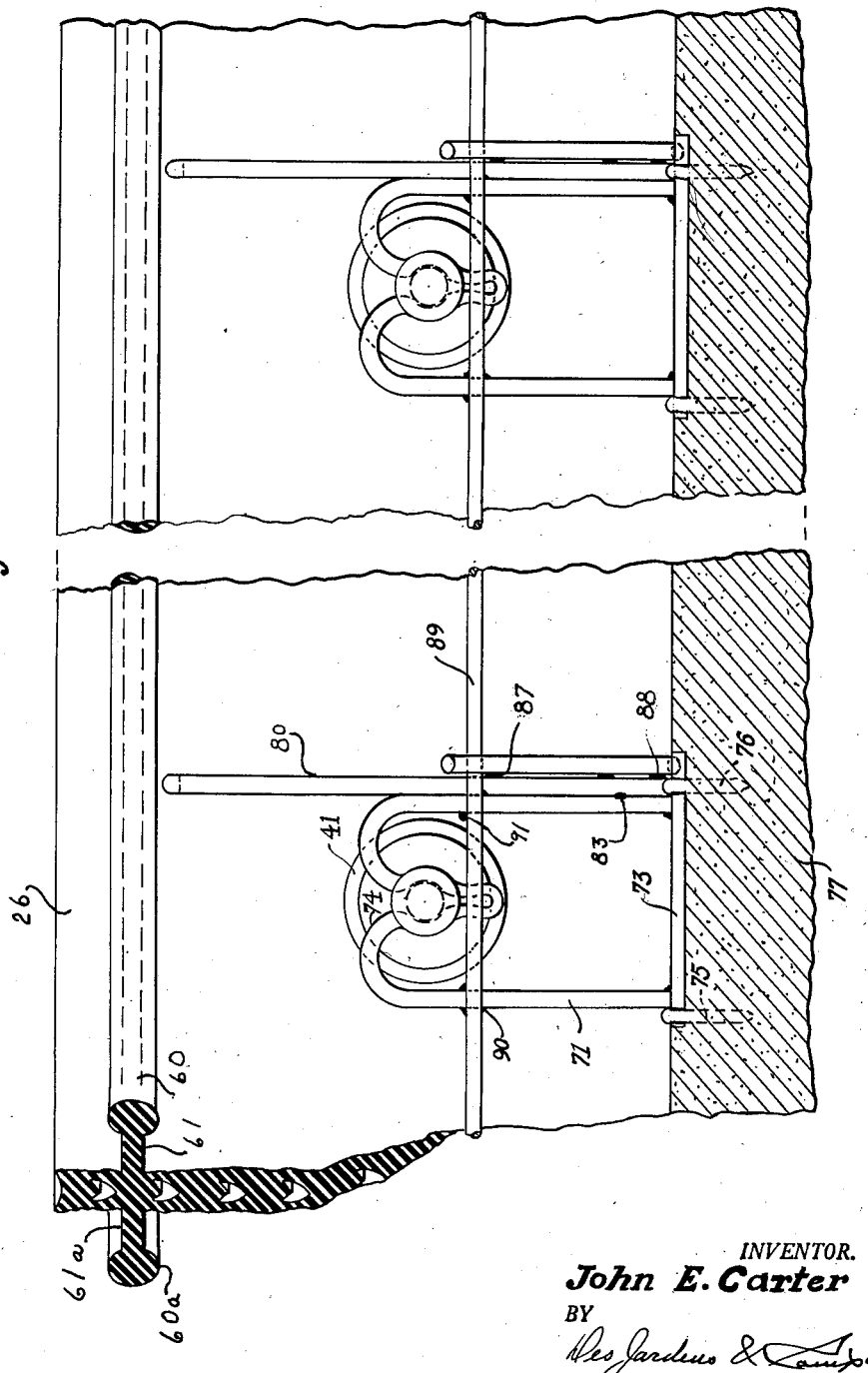

Patented Apr. 1, 1952

2,590,933

UNITED STATES PATENT OFFICE 2,590,933

DOWEL BAR AND JOINT SEALING STRIP CONSTRUCTION

John E. Carter, Columbus, Ohio

Application April 15, 1946, Serial No. 662,368

10 Claims. (Cl. 94—8)

This invention relates to concrete slab road pavements having improved dowel bar and joint sealing strip construction.

It is the common accepted practice, now, to make concrete pavements in the form of slabs joined by vertical expansion joints. These slabs are prevented from tilting relatively, to one another, by means of dowel bars made of steel, such bars being buried in the concrete as it is cast, one end of a dowel bar being in one slab and the other end being in the next adjoining slab. Each of these slabs contracts and expands with variations in temperature, and such embedded dowel pins, therefore, must be free on at least one end to move with respect to the concrete. Sealing substances are used to fill the vertical cracks between the slabs, to make them watertight in order to prevent erosion and ice damage.

I have provided a novel floating, lubricated dowel bar having waterproof casings which cooperate with an elastomeric and compressible joint sealing strip to form a permanent watertight joint under all conditions of expansion and contraction occasioned by the elements. I also provide means to tie together the concrete slabs joined by my novel dowel bar so that the joints between them may open only so far as will be within the elastomeric range of the sealing strip.

The most important elastomers contemplated for use as a sealing strip are natural rubber, or rubber-like materials commonly termed synthetic rubber. Because I use an oil lubricant in my dowel bar, I prefer one of the synthetic rubber compounds of the butadiene copolymer type. It is a well-known characteristic of rubber that it is incompressible, so that when it is distorted in one direction a compensating distortion will occur elsewhere in the body to keep the volume constant. I have overcome the objection to the use of rubber as a joint sealing means, said objection being based on its incompressibility, by providing a plurality of dead air cells or channels in the elastomeric sealing strip which, because of the compressibility of contained air, permits the strip to be compressed without distortion, which prevents protrusion of it from the joint to form a ridge in the surface of the road.

It is, therefore, the principal object of my invention to provide a novel expansion joint for concrete slab pavement roads, utilizing a lubricated dowel bar assembly which acts both as a tie between adjacent slabs and as means for preventing tilting of them relative to one another, and to provide an elastomeric air cell containing sealing strip, cooperating with the dowel bars, to prevent seepage of moisture into the joints.

Another object of my invention is to provide a lubricated dowel bar, for joining concrete slabs.

Another object of my invention is to provide an elastomeric sealing strip for use as a vertical joint sealer between concrete road slabs, which strip cooperates with dowel bars passing therethrough to form a weather-proof expansion joint.

Another object of my invention is to provide a dowel bar construction for tying concrete slabs together whereby the slabs are freely movable during expansion and contraction.

Another object of my invention is to provide a dowel bar construction for concrete slab pavements wherein the dowel bars are lubricated from lubricant reservoirs rendered effective by the contraction and expansion movements of the concrete.

Another object of the invention is to provide a novel dowel bar assembly which may be assembled to a rubber joint-sealing strip, to be used in road construction, so that concrete may be cast around the assembly, which dowel bar assembly thereafter contributes to the function of the strip in sealing the joints from penetration of the moisture, provides against tilting of the pavement, and which permits of free and easy expansion and contraction between the joints.

Further objects, and objects relating to details of construction and economies of operation, will definitely appear from the detailed description to follow. In one instance, I have accomplished the objects of my invention by the devices and means described in the following specification. My invention is clearly defined and pointed out in the appended claims. Structure constituting preferred embodiments of my invention are illustrated in the accompanying drawings forming a part of this specification, in which:

Fig. 5 is a view in side elevation of an installation of a dowel bar, with the cooperating sealing strip and the chairs, all fastened together on a road base, ready for the pouring of concrete thereon.

Fig. 6 is a view of the sealing strip held in position on a road base, by means of wire chairs, and shows the dowel bars held in place by other wire chairs, ready for casting of concrete thereabout.

In the drawings, the same reference numerals refer to the same parts throughout the several views, and the sectional views are taken looking in the direction of the arrows at the ends of the section lines.

Figure 1:
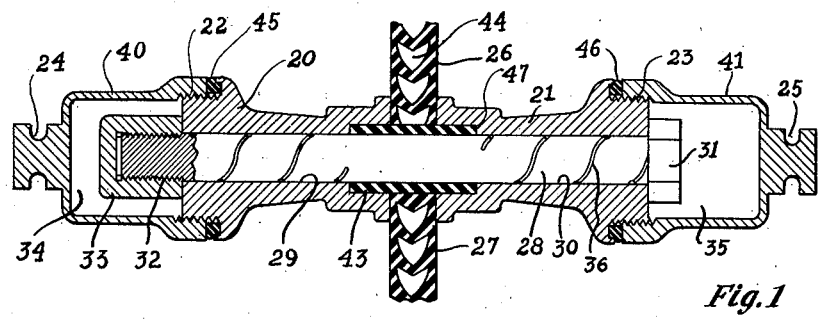
Fig. 1 is a vertical sectional view through a dowel bar and a cooperating rubber sealing strip.

Referring to Fig. 1, left and right metal dowel bar casings 20 and 21 have internal bores 29 and 30, respectively, accommodating the metal dowel bar 28 having on one end thereof a bolt head 31, and having on the other end screw threads 32 for receiving an end cap 33. Intermediate the bolt head end of the dowel bar 28 and the screw threads on the other end, is a helical groove 36 cut along the shank of the dowel, except for a space in the middle. The outer ends of the casings 20 and 21 are provided with threads 22 and 23, respectively, onto which are screwed access caps 40 and 41, leaving lubricant storage cavities 34 and 35. On the end of cap 40 is a boss having a circumferential groove 24, and, on the end of cap 41 is a boss having a curcumferential groove 25. An elastomeric strip 26, having longitudinal air cells 44, is pierced to receive dowel bar 28 fitted with an elastomeric sleeve 43. Water seal 45 is provided between the cap 22 and the casing 20, and water seal 46 is provided between the cap 41 and the casing 21.

In assembling the dowel bar and casings to the sealing strip, the casing 21, with the cap 41 removed thereon, has dowel bar 28 inserted therethrough, and then the sleeve 43 is slipped over the threaded end of the dowel bar until it is seated against the corner 47 of casing 21. The threaded end of the dowel bar is then inserted through the hole provided therefor in the sealing strip 26, and then the casing 20 is fitted thereover, and end cap 33 is thereafter screwed onto the threads 32 so that the two casings 20 and 21 are drawn snugly against the sealing strip 26 forming a water-tight contact therewith. The air cavities 44 in the sealing strip allow the same to be compressed slightly, without distorting the strip upwardly, by drawing up on the bolt head 31. Adjustment may be made at the time the concrete is to be poured around the assembly, for the degree of tightness with which the dowel bar assembly is to grip the sealing strip during the greatest extreme of contraction of the concrete. The caps 40 and 41 are then screwed in place against the seals 45 and 46, after being filled with lubricant. The various offsets in the contours of the outside of the casings 20 and 21, and of the caps 40 and 41, cause the set concrete to firmly grip the dowel bar casings. There may be relative movement between the dowel bar 28 and the casings 20 and 21, when the concrete expands and compresses the rubber strip. In such event, the lubricant in cavities 34 and 35 may seep into the lubricating groove 36 cut around the dowel bar, as under such circumstances there is clearance either between bolt head 31 and casing 21 and between cap 33 and casing 20, or both.

It will be observed that the dowel bar assembly, because the bolt head 31 and the cap 33 bear against locking offsets in the casings, does not permit the casings 20 and 21 to be drawn farther apart than is determined by the tightness with which the cap 33 is screwed onto the dowel 28, and thus, as the casings 20 and 21 are firmly embedded in the concrete, the assembled structure acts to tie the adjacent concrete slabs together. As, in the assembly, this maximum separation of casings 20 and 21 still maintains a water-tight seal with the elastomeric strip, no water can get into the dowel bar assembly, nor in the joint.

When the dowel bar works, due to contraction and expansion of the concrete slabs in which it is embedded, it is kept lubricated so that at all times it is protected against corrosion and is freely movable in the casings without any binding action against the casing wall. The dowel bar fits in its casings with sufficient snugness so that loads borne by the road are transmitted from one slab to the next.

The circumferential grooves 24 and 25 are provided, as has been said, for the purpose of engaging chairs while the dowel bar and elastomeric strip seal assembly are put in place on the road bed before the concrete is cast about it. Referring to Fig. 5, a complete vertical sectional view of the elastomeric strip is shown with the dowel bar 28 piercing the aperture therein and being sealed into the aperture by elastomeric sleeve 47. Near the top of the joint and running horizontally along the strip on either side are beads 60 and 60a integral with the strip and joined thereto by necks 61 and 61a, respectively, said beads being embedded in the concrete, the proposed top line of which is shown at 62, for the purpose of maintaining the joint between the two slabs of concrete 63 and 64 impervious to water, even though the blocks upon contraction stretch the necks 61 and 61a. The thickness of the necks 61 and 61a, and the diameter of beads 60 and 60a permits the said necks to be stretched considerably without causing the beads to be loosened from their embedment in the concrete. Because of the contours of the beads and the elastomeric characteristic of them, even though considerable stretching occurs, no water penetration of the joint is possible.

For each dowel bar unit there is a chair 70 cooperating with the circumferential groove 24 of cap 40, and a chair 71 (see, also, Fig. 6) cooperating with the circumferential groove 25 of cap 41. The chairs are made of wire and, as seen in Fig. 6, the two legs of a chair are joined at the bottom by a cross piece 73 welded thereto, and the legs join at the top in a downwardly curving loop 74 engaging the circumferential groove of cap 41. Staples 75 and 76 hold the chair to the road base 77. Bracing the two chairs 70 and 71 (Fig. 5) is a wire piece 80 forming a supporting U-shaped portion 81 in which the elastomeric strip 26 is held upright. The wire 80 is welded to piece 70 at point 82, and is welded to piece 71 at point 83. A further brace 84a, made of wire, is welded to point 84 and point 85, and a corresponding wire 86 is welded to points 87 and 88. Thus, for each dowel bar assembly there is an arrangement of wire chair seats for holding the dowel bar unit and the elastomeric strip in place before the concrete is cast. A further supporting wire 89 (Fig. 6) is welded to all the wire supports serving a particular concrete section or slab and such is welded to each chair, like chair 71, at points like point 90 and point 91, thus forming a self-supporting framework which will not be distorted or allow the positioning of the assembled dowel bar structure and elastomeric strip structure to be distorted by the weight of the concrete as it is being poured thereover.

Figure 2:
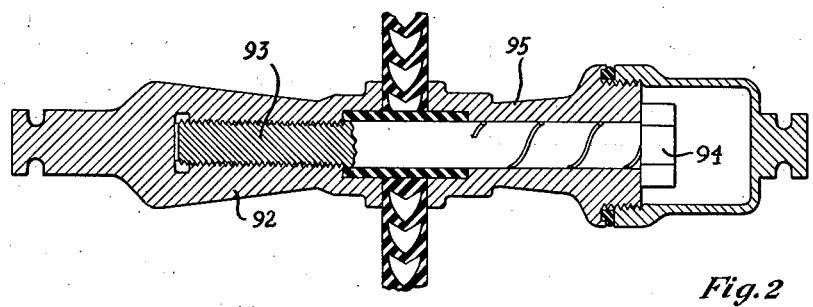
Fig. 2 is a modified form of the dowel bar assembly shown in Fig. 1.
Figure 3:
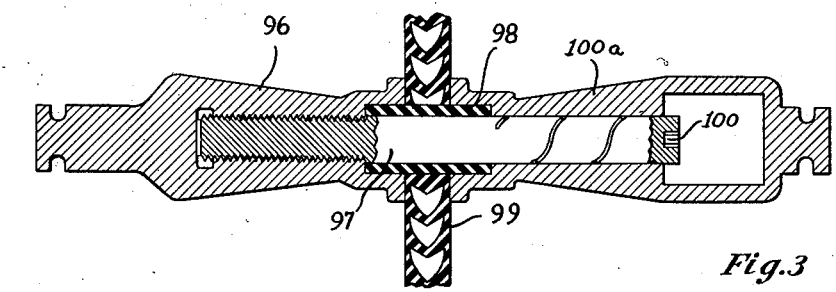
Fig. 3 is a further modified form of the dowel bar assembly of Fig. 1.
Figure 4:
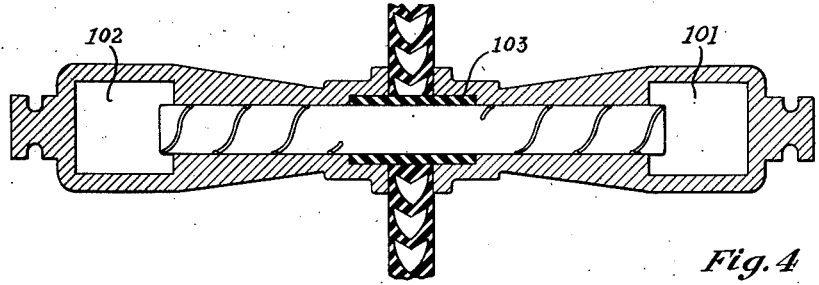
Fig. 4 is another modified form of the dowel bar assembly of Fig. 1.

Certain modifications in the dowel bar and casings assembly, itself, are shown in Figs. 2, 3 and 4. In Fig. 2, the left-hand component of the dowel bar has a threaded end 93 received in an internal threaded bore in the casing 92. No lubricant reservoir is provided in this casing, and no movement of the dowel bar therein is possible. Any movement occasioned by expansion and contraction of the blocks is taken up by the movement of the dowel bar in the right-hand half of the assembly which is like that of Fig. 1. It will be apparent that in Fig. 2 the left and right-hand casings of the dowel bar are tied firmly together so that the two slabs joined thereby cannot move further apart than the bolt head 94 permits and that the dowel bar is lubricated, the same as in the construction shown in Fig. 1, on expansion of the joint. Fig. 3 is similar to the construction in Fig. 2, except that a bolt head is not provided on the right end of the dowel bar but the dowel bar is free to move in the right-hand casing 95. In assembling the structure of Fig. 3, the casing 96 has a dowel bar 97 screwed therein. The sleeve 98 is slipped over the dowel bar, and the dowel bar, with the sleeve 98 thereon, is slipped into the opening in the strip 99, and the casing 100a is slipped thereover and held thereon by friction of the sleeve 98. A tool opening 100 is provided for the insertion of a tool to turn the dowel bar relatively to casing 96. In Fig. 4 is shown a further modification in which neither end of the dowel bar is held secured in the casing. The dowel constructions shown in Figs. 3 and 4 provide for lubrication, however that construction shown in Fig. 3 provides for lubrication only from the one casing 100a, whereas in the construction of Fig. 4 lubrication is provided from both the right chamber 101 and the left chamber 102. Constructions of Figs. 3 and 4 are both waterproof by reason of the use of an elastomeric sleeve 98 in the case of Fig. 3 and the use of elastomeric sleeve 103 in the case of Fig. 4.

In all of the floating dowel bar joint constructions heretofore known, the same have been subject to water damage which causes corrosion, friction and grinding action in the concrete thereby causing diminution of their functioning and consequent breaking of the pavement around the joints. I have by the foregoing disclosure provided means which maintains the vertical joints waterproof and which also ties the blocks of concrete together, but allows them to move easily, during expansion and contraction, with relation to the dowel bars.

I am aware that the devices disclosed herein may be varied considerably without departing from the spirit of my invention and therefore, I claim my invention broadly as indicated by the appended claims.

Having thus described my invention, what I claim as new and useful, and desire to secure by Letters Patent, is:

1. A dowel assembly for use in constructing concrete slab roads including in combination a dowel bar having a groove formed on its exterior surface in from the opposite ends, a compressible sleeve fitted snugly over the mid-portion of said dowel bar, and a chambered housing, including an oil reservoir, provided with an open end fitted on each end of the dowel bar in sealing relation with the sleeve.

2. A dowel assembly as set forth in claim 1 in which the sleeve is of elastomeric material.

3. A dowel assembly as set forth in claim 1 in which the dowel bar is fixed to one of the chambered housings.

4. A dowel assembly as set forth in claim 1 in which connecting means for the dowel bar and housings is provided to hold said housings in assembled relation on said dowel bar.

5. A dowel bar assembly as set forth in claim 4 in which the connecting means provides for limited relative movement of at least one of the housings and the dowel bar.

6. A dowel assembly for use in constructing concrete slab roads including in combination a dowel bar having a groove formed on its exterior surface in from the opposite ends, a compressible sleeve fitting snugly over the mid-portion of said dowel bar, and a chambered housing, including an oil reservoir, provided with an open end fitted on each end of the dowel bar and telescoping in sealed relation with the sleeve, said dowel bar being connected to the housings to provide for relative movement between the dowel bar and at least one of the housings.

7. A dowel assembly as set forth in claim 6 in which the connecting means is fixed to one of the housings.

8. A dowel assembly as set forth in claim 6 in which the dowel bar is relatively movable in respect to each of the housings.

9. A dowel assembly as set forth in claim 8 in which the connecting means is adjacent each end of the dowel bar for engaging the housings to limit their relative movement.

10. A dowel bar assembly for use in constructing concrete slab roads including in combination a dowel bar having a groove on its exterior surface in from the opposite ends, a compressible sleeve fitted snugly over the mid-portion of said dowel bar, and a chambered housing, including an oil reservoir, provided with an open end fitted on each end of dowel bar in sealed relation with the sleeve, and floatingly holding the dowel bar in position.

JOHN E. CARTER.

REFERENCES CITED

The following references are of record in the file of this patent:

UNITED STATES PATENTS

| Number | Name | Date |
| --- | --- | --- |
| 1,289,408 | Davis | Dec. 31, 1918 |
| 1,832,493 | Marsilius | Nov. 17, 1931 |
| 2,042,524 | Hall et al. | June 2, 1936 |
| 2,080,124 | Friberg | May 11, 1937 |
| 2,101,883 | Warner | Dec. 14, 1937 |
| 2,181,623 | Klein | Nov. 28, 1939 |
| 2,263,150 | Westcott | Nov. 18, 1941 |
| 2,269,703 | Bagwill | Jan. 13, 1942 |
| 2,280,455 | Seuberling | Apr. 21, 1942 |
| 2,365,550 | Heltzel | Dec. 19, 1944 |
| 2,419,022 | Heltzel | Apr. 15, 1947 |
| 2,508,443 | Carter | May 23, 1950 |

FOREIGN PATENTS

| Number | Country | Date |
| --- | --- | --- |
| 123,706 | Great Britain | Mar. 6, 1919 |
| 194,115 | Great Britain | Mar. 8, 1923 |

OTHER REFERENCES

Five Way Expansion Joint Co. pamphlet, August 12, 1937.